United States Patent [19]
Szölgyenyi et al.

[11] Patent Number: 5,344,473
[45] Date of Patent: Sep. 6, 1994

[54] APPARATUS FOR THE DEPOSITION OF MELAMINE

[75] Inventors: Gerald Szölgyenyi, late of Linz, Austria, by Andrea Szölgyenyi, legal representative; Peter Hildebrand, Linz, Austria

[73] Assignee: Chemie Linz Gesellschaft m.b.H., Linz, Fed. Rep. of Germany

[21] Appl. No.: 38,276

[22] Filed: Mar. 29, 1993

[30] Foreign Application Priority Data

Mar. 30, 1992 [AT] Austria .................................. 630/92

[51] Int. Cl.⁵ ............................................. B01D 47/00
[52] U.S. Cl. ......................................... 55/223; 141/67; 239/423
[58] Field of Search ............................ 55/93, 94, 223; 261/DIG. 75, 142; 141/28, 67; 239/398, 420, 423

[56] References Cited

U.S. PATENT DOCUMENTS

| | | | |
|---|---|---|---|
| 1,101,264 | 6/1914 | Eneas | 239/398 |
| 1,656,160 | 1/1928 | Badaracco | 239/398 |
| 2,755,887 | 7/1956 | Boatright . | |
| 3,170,007 | 2/1965 | Krantz | 55/94 |
| 3,290,308 | 12/1966 | Marten . | |
| 3,315,442 | 4/1967 | Yuan et al. | 55/70 |
| 3,388,533 | 6/1968 | Weinrotter et al. | 55/82 |
| 3,451,787 | 6/1969 | Marten . | |
| 3,884,653 | 5/1975 | Capulli et al. | 55/223 |
| 4,051,204 | 9/1977 | Müller et al. | 261/DIG. 75 |
| 4,643,742 | 2/1987 | Hammarskog | 55/94 |
| 4,931,225 | 6/1990 | Cheng | 261/DIG. 75 |
| 5,054,423 | 10/1991 | Escobal | 261/DIG. 75 |
| 5,061,406 | 10/1991 | Cheng | 261/DIG. 75 |

FOREIGN PATENT DOCUMENTS

| | | | |
|---|---|---|---|
| 2405669 | 9/1974 | Fed. Rep. of Germany | 55/223 |
| 1149301 | 4/1969 | United Kingdom . | |

Primary Examiner—James C. Housel
Assistant Examiner—Laura E. Collins
Attorney, Agent, or Firm—Wenderoth, Lind & Ponack

[57] ABSTRACT

An apparatus is provided for the deposition of melamine from hot reaction gases into a wash liquid. The apparatus includes a heated gas feed pipe for introducing the hot reaction gases into an absorption pipe. The gas feed pipe is provided with an extension nozzle, the lower end of which projects coaxially into the absorption pipe. The upper part of the absorption pipe and the gas feed pipe are surrounded by a closed container which serves as a storage vessel for wash liquid. The inner wall of the absorption pipe is constantly washed by flowing wash liquid from the closed container.

7 Claims, 1 Drawing Sheet

APPARATUS FOR THE DEPOSITION OF MELAMINE

BACKGROUND OF THE INVENTION

The invention relates to an apparatus for the deposition of melamine from hot reaction gases.

U.S. Pat. No. 3,388,533 discloses that the melamine obtained in a catalytic melamine synthesis can be deposited from hot reaction gases, for example by cooling, on cooled metal walls or in a fluidized bed of melamine crystals. The crude melamine obtained is very contaminated and must be purified by expensive recrystallization. According to the invention described in U.S. Pat. No. 3,388,533, pure melamine can be obtained without additional recrystallization by separating the hot, melamine-containing reaction gases directly in a wash liquid after the synthesis in order to avoid decomposition reactions and contamination. In this process, pure melamine is obtained in a very simple manner, but the process has the disadvantage that very high reaction gas temperatures of about 440° C. are required at the entry point of the reaction gases into the deposition apparatus in order to prevent deposits of melamine or blockage of the apparatus with solid melamine. It was the object of the invention to provide an apparatus which permits melamine deposition even at lower reaction gas temperatures. It was found, unexpectedly, that this object can be achieved by a combination of different construction measures in which, on the one hand, heatable apparatus parts and, on the other hand, apparatus parts which inhibit back-flow of the reaction gases from the absorption container are used.

SUMMARY OF THE INVENTION

The invention accordingly relates to an apparatus for the deposition of melamine from hot reaction gases into a wash liquid. The apparatus includes an absorption pipe with an open upper end, and a closed container surrounding the open upper end of the absorption pipe. A heatable gas feed pipe is provided in the closed container for introducing hot reaction gases into the absorption pipe. The closed container is further provided with a wash liquid feed pipe for introducing wash liquid into the closed container up to a level just above the open upper end of the absorption pipe so the wash liquid will flow into the absorption pipe and along its inner walls. The closed container also has an inert gas feed pipe for introducing inert gas into the container to prevent reaction gases introduced into the absorption pipe from escaping. An extension nozzle is mounted to the gas feed pipe to act as an extension thereof, and projects downwardly into the open upper end of the absorption pipe.

The apparatus is preferably also equipped with a heating apparatus for heating the gas feed pipe and the area therearound. When the apparatus is also equipped with the heating apparatus, and also with the extension nozzle, back-flow of the reaction gases from the absorption pipe into the upper parts of the closed container, which are not washed by the wash liquid, is reduced or prevented. The heating apparatus preferably projects into the upper part of the closed container. Thus, with the apparatus according to the invention it is possible to avoid blockage of the apparatus with solid melamine even at lower reaction temperatures of about 325°–400° C.

Despite the fact, disclosed for example in G. van der Plaats et al., Proc. Second European Symposium on Thermal Analysis (Chem. Abstr. 96 (7): 51647f), page 215, that melamine begins to decompose at temperatures above 300° C., for example into melem or melam, no thermal decomposition products of melamine were detectable on the heated parts of the apparatus according to the invention.

The lower entry temperature of the reaction gases into the deposition apparatus, which is possible when the apparatus according to the invention is used, permits substantially improved energy utilization in comparison with conventional melamine deposition apparatuses. The reaction gases emerging at about 440° C. from the catalyst oven can be cooled to about 325° to 400° C. with the aid of a heat exchanger, for example, before entering the deposition apparatus. The large quantity of heat recovered can be returned to the synthesis circulation, with the result that a substantial saving of energy is achieved.

To even further reduce or prevent back-flow of the reaction gases from the absorption pipe, it has furthermore proven advantageous to provide a constriction in the absorption pipe, near the extension nozzle.

DETAILED DESCRIPTION OF THE INVENTION

Figure 1:
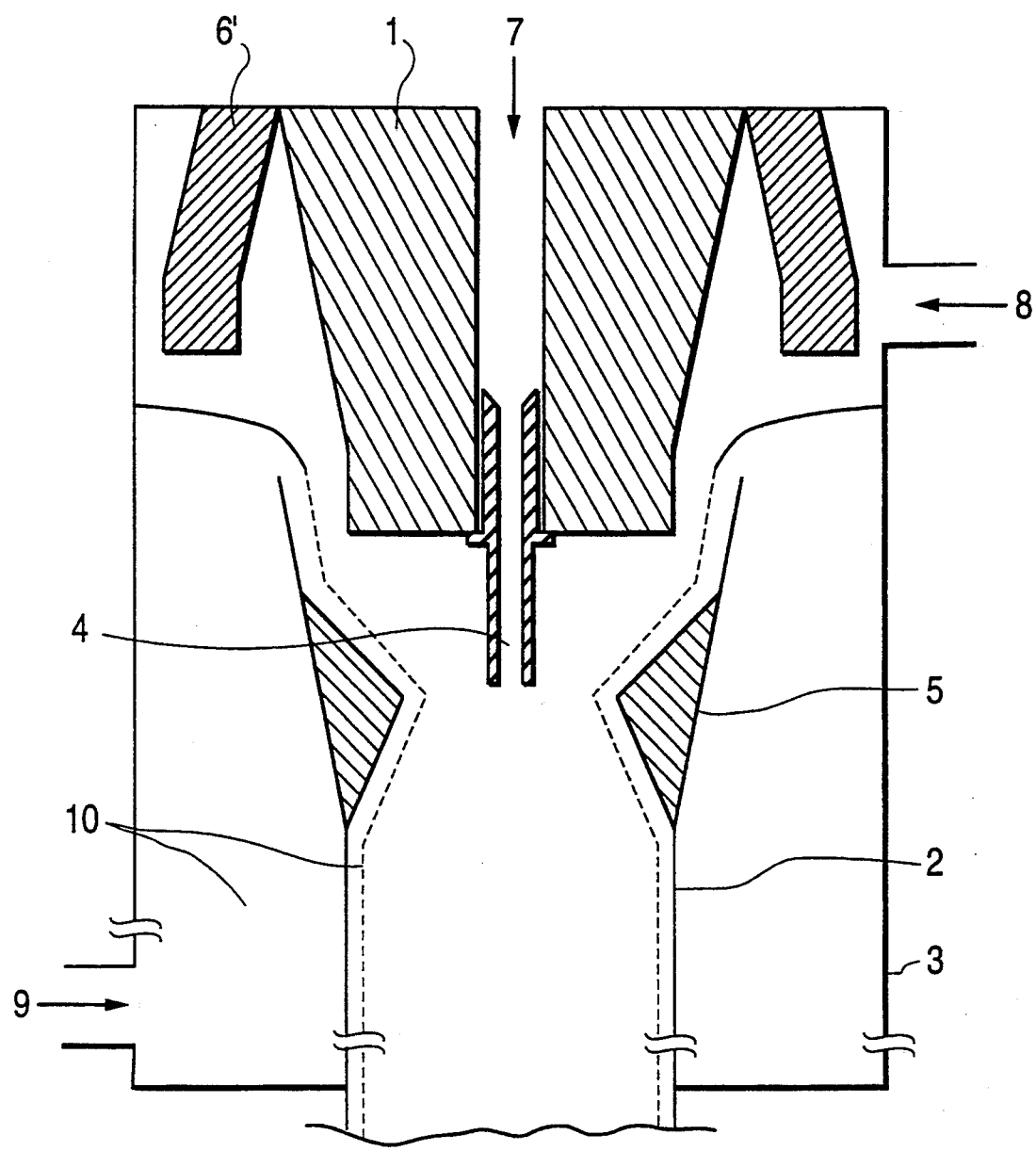
FIG. 1 shows an embodiment of the melamine deposition apparatus according to the invention.

The melamine deposition apparatus will now be more fully described with reference to FIG. 1 and by reference to an example.

In FIG. 1, (1) represents a heatable gas feed pipe for introducing the hot reaction gases (7) and which projects into an absorption pipe (2). (3) represents a substantially closed storage container for storing wash liquid (10). (4) represents an extension nozzle mounted on the gas feed pipe (1) and projecting into the absorption pipe (2). (5) represents a narrow point or constriction in the absorption pipe (2), and (6') is a heatable jacketed pipe arranged in the upper part of the container (2) on the gas feed pipe (1). (8) represents a feed pipe for introducing inert gases into the container (3), and (9) represents a feed pipe for introducing the wash liquid (10) into the container (3) up to a level just above the open upper end of the absorption pipe (2).

The wash liquid (10) pumped into the container (3) flows over the upper edge of the absorption pipe (2), along the inner walls of the absorption pipe (2), and downward into a deposition container (not shown). The wash liquid is circulated back into the storage container (3). Melamine is introduced with the hot reaction gases (7) and is deposited in the wash liquid (10) flowing along the inner walls of the absorption pipe (2) and, together with the wash liquid (10), enters the separation container (not shown), where melamine and other components of the reaction gas, for example ammonia and $CO_2$, are separated off.

The extension nozzle (4) projects into the absorption pipe (2), preferably approximately into the region of the constriction (5). The further the extension nozzle (4) projects into the absorption pipe (2), the smaller is the back-flow of the reaction gases into the upper, unheated parts of the apparatus which are not in contact with flowing wash liquid (10), and the smaller is the danger of blockage of the apparatus in these parts by solid melamine. On the other hand, however, the extension nozzle (4) should project into the absorption pipe (2) no further than where its tip will cool below about 320° C. due to the cooling effect of the surrounding wash liquid (10) at a temperature of about 50°-100° C. which flows past the absorption pipe. Otherwise, there is a danger of blockage with solid melamine.

The heating apparatus (6') advantageously projects into the storage container (3) to such an extent that it is a distance away from the liquid level of the wash liquid (10) which approximately corresponds to one to six, preferably one to three, times the thickness of the film of wash liquid (10) flowing along the inner surface of the absorption pipe (3). The thickness of the film of wash liquid depends in particular on the size of the plant and the throughput and, for example in the laboratory plant shown in FIG. 1, is about 1 to 5 mm. The distance between the gas feed pipe (1) and the wash liquid (10) flowing down inside the absorption pipe (2) is advantageously likewise about one to six, preferably one to three, times the thickness of the wash liquid film flowing down inside the absorption pipe.

Although the heating apparatus (6') is preferably in the form of a heatable jacketed pipe which is arranged on the upper part of the gas feed pipe (1) and projects downward into the closed container (3), other suitable heating apparatuses (6') are, for example, heating wires, heating rods, heating coils and heatable installations of other shapes.

The gas feed pipe (1) and the heating apparatus (6') can be heated, for example, electrically or by means of heating media. Heating is preferably effected electrically or by means of a heating liquid, such as, for example, silicone oils, diphyl or salt melts.

The constriction (5) in the absorption pipe (2) is produced, for example, by inserting a correspondingly dimensioned ring into the absorption pipe (2), which may widen in the upper part in the form of a funnel, for example as shown in FIG. 1. It is also possible to weld on an annular bead inside the absorption pipe (2) to narrow the cross-section, or to form the absorption pipe (2) in this shape. The cross-section of the absorption pipe (2) is preferably reduced by about 50-80% by the constriction (5).

EXAMPLE 1

The reaction gases emerging from a melamine synthesis oven were cooled via a heat exchanger from 440° C. to 380° C. and were passed via the gas feed pipe (1) continuously into the melamine deposition apparatus according to the invention and shown in FIG. 1 (scale 1:1), with a throughput of 300 l/h. The gas feed pipe (1) and the jacketed pipe (6') were electrically heated to 380° C. In the feed pipe (8), 150 l/h of nitrogen as flushing gas were passed in at a temperature of 380° C. and about 160 l/h of wash liquid (10) were pumped into the container (3) through feed pipe (9). The temperature of the wash liquid in the container was about 70° C. The wash liquid (10) flowed over the upper edge of the absorption pipe (2) into the absorption pipe and down along inner wall. The inner wall was thus wet with an approximately 2 mm thick film of the wash liquid. The melamine entering with the reaction gases was deposited in the wash liquid flowing down and, together with the wash liquid, entered a separation container (not shown) in which melamine and other components of the reaction gas were separated off. The wash liquid was then pumped back into the container (3).

The melamine deposition apparatus according to the invention could be operated without faults. The experiment was terminated after 48 hours, and only slight deposits which had no effect on the operation of the plant being detectable.

COMPARATIVE EXAMPLE 2

Analogously to Example 1, the reaction gases were passed at a temperature of 380° C. into a melamine deposition apparatus which differed from that according to Example 1 in that the gas feed pipe (1) was not heated and in that the extension nozzle (4), the constriction (5) and the jacketed pipe (6') were absent. The apparatus was blocked by solid melamine after 2 hours so that operation of the plant had to be stopped.

What we claim is:

1. A melamine deposition apparatus comprising:
   an absorption pipe having an open upper end;
   a substantially closed container surrounding said open upper end of said absorption pipe;
   a heatable gas feed pipe mounted in said container for feeding melamine-containing reaction gases downwardly into said open upper end of said absorption pipe;
   a wash liquid feed pipe opening into a lower portion of said container for feeding wash liquid into said container to a level just above a lip of said open upper end of said absorption pipe, such that the wash liquid fed into said container can flow as a continuous film over said lip and down along an inner wall of said absorption pipe;
   an inert gas feed pipe opening into an upper portion of said container for feeding inert gas into said upper portion of said container; and
   an extension nozzle mounted to and extending downwardly from a lower end of said gas feed pipe and into said open upper end of said absorption pipe.

2. A melamine deposition apparatus as recited in claim 1, further comprising
   a heater mounted in said upper portion of said container adjacent said heatable gas feed pipe.

3. A melamine deposition apparatus as recited in claim 2, wherein
   said heater comprises a heating means for heating said heatable gas feed pipe and said upper portion of said container.

4. A melamine deposition apparatus as recited in claim 3, wherein
   said heating means is operable to heat said heatable gas feed pipe and said upper portion of said container electrically or with heating liquid.

5. A melamine deposition apparatus as recited in claim 2, wherein
   said heater comprises a heatable jacketed pipe mounted about an upper portion of said heatable gas feed pipe and projecting down into said container.

6. A melamine deposition apparatus as recited in claim 1, further comprising
   a constriction element mounted in said absorption pipe to reduce a cross-sectional size of said absorption pipe at a location adjacent a lower tip of said extension nozzle.

7. A melamine deposition apparatus as recited in claim 6, wherein
   said constriction element has an inside cross-sectional area about 50 to 80 percent smaller than an inside cross-sectional area of said absorption pipe at said constriction element.

* * * * *